United States Patent [19]

Mizuno et al.

[11] Patent Number: 5,310,386
[45] Date of Patent: May 10, 1994

[54] TOOTHED BELT HAVING COATED CORES EXHIBITING IMPROVED RESISTANCE

[75] Inventors: Takahide Mizuno; Nobutaka Osako; Takeshi Murakami; Yasunori Nakai, all of Kobe, Japan

[73] Assignee: Mitsuboshi Belting Ltd., Kobe, Japan

[21] Appl. No.: 959,057

[22] Filed: Oct. 9, 1992

[51] Int. Cl.5 .................................................. F16G 1/28
[52] U.S. Cl. ...................................... 474/205; 474/263
[58] Field of Search .......................... 474/205, 263, 268; 428/378, 383, 394

[56] References Cited

U.S. PATENT DOCUMENTS

| | | | |
|---|---|---|---|
| 4,596,854 | 6/1986 | Yotsumoto et al. | 525/133 |
| 4,861,820 | 8/1989 | Toyoda et al. | 524/510 |
| 4,963,613 | 10/1990 | Toyoda et al. | 524/594 |
| 5,039,777 | 8/1991 | Yotsumoto et al. | 528/155 |
| 5,209,961 | 3/1993 | Yokoi | 428/161 |
| 5,217,801 | 6/1993 | Hamada | 428/295 |
| 5,219,902 | 6/1993 | Mishima et al. | 523/206 |
| 5,230,667 | 7/1993 | Nakajima | 474/263 |
| 5,234,387 | 8/1993 | Fujiwara et al. | 474/205 |
| 5,246,051 | 9/1993 | Inada et al. | 152/527 |
| 5,250,010 | 10/1993 | Mishima et al. | 474/263 |

FOREIGN PATENT DOCUMENTS 207443 9/1986 Japan.

Primary Examiner—Douglas D. Watts
Attorney, Agent, or Firm—Wood, Phillips, VanSanten, Hoffman & Ertel

[57] ABSTRACT

A toothed belt has cores coated with a resorcin-formalin-latex liquid that includes as the latex component at least about 60 wt % of a hydrogenated acrylonitrile-butadiene rubber or a chlorosulfonated polyethylene rubber. The teeth can be covered with a tooth covering fabric that is made from yarns containing at least 50 volume percent of aramid fibers.

14 Claims, 1 Drawing Sheet

5,310,386

TOOTHED BELT HAVING COATED CORES EXHIBITING IMPROVED RESISTANCE

TECHNICAL FIELD

The present invention generally relates to a toothed belt and, more particularly, to a toothed belt having improved heat, flex and wear resistance. These improvements are achieved by use of a hydrogenated nitrile or chlorosulfonated polyethylene latex to coat fiber cores embedded in the belt.

BACKGROUND OF THE INVENTION

Toothed belts having tooth elements and a surface rubber layer that are formed of a rubber mix containing chloroprene as the main rubber component, a fiber core adhesively treated with a resorcin-formalin-latex (RFL) and a tooth covering fabric material are known. The core can be a glass fiber cord or an aramid fiber cord made from glass or aramid filaments. Crimped nylon yarns can be used as fillings in the longitudinal direction of the belt. The belts can contain 10 to 25 cords with a pitch of 0.8 to 1.5 millimeters (mm). Conventionally, the teeth are covered with a fabric material made of 6,6 nylon. These belts can be used in automobiles.

The ambient temperature conditions in which automotive toothed belts of an overhead cam drive are used have recently become more and more demanding because engine compartments have become more compact and because of the adoption of the forced fuel system, i.e., fuel injection. These conditions have increased the ambient temperature within the engine compartment to which the belt is exposed. Conventional toothed belts that use chloroprene often experience cracking and/or breaking off of the rubber surface or tooth or deterioration of the cores due to flexing at high temperatures. The belt often breaks under these conditions.

Due to the requirements for greater surface durability of toothed belts in general and automotive toothed belts in particular, either hydrogenated nitrile rubber (HNBR) produced by hydrogenating acrylonitrile-butadiene copolymer or chlorosulfonated polyethylene (CSM) is used as the main rubber. Use of such a rubber is disclosed in, for example, Japanese Patent Application Laid-Open No. 62-159827.

Cords are conventionally treated with an RFL liquid in which the latex component is an emulsified latex having a vinylpyridine-styrene-butadiene terpolymer as a principal ingredient with which a copolymer is blended. Representative copolymers include butadiene-styrene copolymer and acrylonitrile-butadiene copolymer. However, the glass fiber cords and aramid fiber cords treated with this RFL latex experience hardening of the RFL liquid deposited thereon during vulcanization because, as it is presently theorized, radicals produced during the decomposition of the organic peroxides cause excessive crosslinking. The hardening results in a loss of flexibility. When the belt is bent in use, filament breakage often occurs, which results in premature belt breaking and a decrease in tensile strength of the belt. In particular, glass filaments, which are less flexible than aramid fibers are more liable to fail.

The rubber composition in the backing member and/or tooth elements, the adhesive bond of the glass or aramid fiber cord and the tooth covering fabric material are all in close relationship and interact to affect the surface life of the belt. For example, in some experiments in which toothed belts were run in a high temperature environment, RFL liquid deposited on the glass or aramid fiber cord became heat-aged even when the rubber composition used for the backing member and/or tooth elements was heat resistance HNBR or CSM rubber. The cord and the rubber composition separated from each other because of the reduced bond strength caused by heat aging. Furthermore, the flex resistance of the belt was substantially lowered.

Belts under high load and tension conditions require suitable reinforcement from the covering fabric material. In a high temperature environment, the tooth root flank covering fabric that comes in contact with the pulley teeth can wear early which leads to cracking at the tooth flank and loss of the belt. Therefore, the fabric does not provide sufficient protection of the tooth.

The present invention is directed to solving these problems, and it is a primary object of the invention to provide a toothed belt which can retain good heat, flex and wear resistance during operation under high temperature conditions and which can maintain good serviceability for a long time.

SUMMARY OF THE INVENTION

In accordance with this invention, a toothed belt has a plurality of teeth arranged in the longitudinal direction of the belt that extend from one surface of a backing member. Fiber cores are embedded in the backing member. The teeth are covered with a teeth covering fabric. The teeth and backing material preferably are made of an elastomeric material including a hydrogenated acrylonitrile-butadiene rubber (HNBR), in which more than 80% of the double bonds in the molecules of the acrylonitrile-butadiene copolymer are hydrogenated, or chlorosulfonated polyethylene rubber (CSM) and in which the rubber is preferably crosslinked with an organic peroxide. The core can be a glass fiber cord or an aramid fiber cord having a resorcin-formalin-latex (RFL) liquid deposited thereon. The latex has at least 60 wt % of either a hydrogenated acrylonitrile-butadiene latex, in which more than about 80% of the double bonds in the molecules of the acrylonitrile-butadiene copolymer are hydrogenated, or chlorosulfonated polyethylene latex.

The teeth covering fabric can be a canvas made from yarns containing more than about 50 volume % (vol %) of aramid fiber in the longitudinal direction of the belt.

Numerous other advantages and features of the present invention will become readily apparent from the following detailed description of the preferred embodiments and the appended claims.

DETAILED DESCRIPTION OF THE PREFERRED EMBODIMENT

Figure 1:
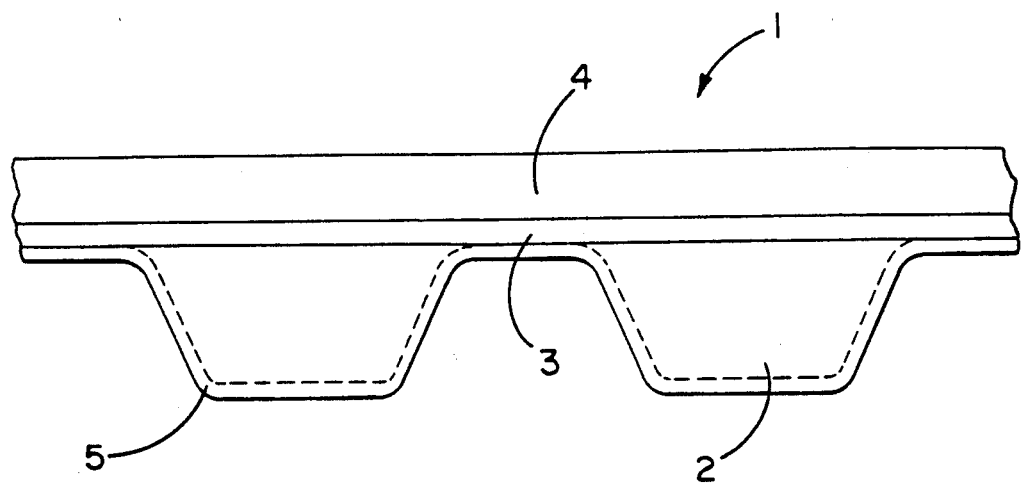
FIG. 1 is a sectional, perspective view showing a toothed belt of the present invention.

Although this invention is susceptible to embodiment in many different forms, there are shown in the drawings and will be described in detail, presently preferred embodiments of the invention. It should be understood, however, that the present disclosure is to be considered as an exemplification of the principles of this invention and is not intended to limit the invention to the embodiments illustrated.

FIG. 1 shows a toothed belt 1 of the present invention having a plurality of teeth 2 arranged in the longitudinal direction of the belt and extending from a surface of a backing material 4 in which is embedded fiber cores 3 (only one of which is shown). The teeth 2 are covered with a tooth covering fabric 5 bonded thereto.

The rubber of the backing member 4 and teeth 2 can be a hydrogenated acrylonitrile-butadiene rubber (HNBR) or chlorosulfonated polyethylene rubber (CSM). The HNBR is produced by hydrogenation to consume more than about 80%, preferably more than about 90%, of the double bonds of the acrylonitrile-butadiene. If less than about 80% of the double bonds are hydrogenated, the HNBR has very poor heat resistance and ozone resistance.

To crosslink the HNBR or CSM, an organic peroxide can be used that does not result in an excessive crosslinking reaction at temperatures prevalent during the processing operation, e.g., a temperature of about 120° to about 130° C. A preferred peroxide is any dialkyl peroxide having a half-life of about 10 hours and a decomposition temperature of not less than about 80° C.

Representative of dialkyl peroxides are di-t-butyl-peroxide, t-butylcumyl peroxide, dicumyl peroxide, 2,5-dimethyl-2,5-di(t-butyl peroxy)hexane, benzoyl-peroxide, $\alpha, \alpha'$-bis(t-butyl peroxy isopropyl)benzene, and the like.

The organic peroxide is used in an amount in the range of 1/10 to about 1/100 mol.

Cords treated with a resorcin-formalin-latex (RFL) liquid having HNBR or CSM latex have been found to exhibit reduced hardening during the belt vulcanization. The RFL coated cords have also been found to exhibit excellent flex properties. It is presently theorized that these results are due to the difference in crosslinking efficiency of the organic peroxides with the types of polymers used as the latex component of the RFL liquid. That is, in conventional belts, using a conventional latex such as a vinylpyridine or styrene-butadiene rubber, the normal amount of organic peroxide used to crosslink the principal rubber component results in crosslinking of the latex with itself and with the rubber component. The crosslinking efficiency of the conventional latex of the RFL liquid is high. In contrast, the HNBR or CSM disclosed herein do not have as high of a crosslinking efficiency. Chloroprene rubber, nitrile rubber, isoprene rubber and nitrile-butadiene rubber have crosslinking efficiencies equal to or lower than that of the rubber of the belt but do not have sufficient heat resistance which makes them unusable in toothed belt operations.

At least about 60 weight percent (wt %) of the latex in the RFL liquid is a HNBR, in which more than about 80% of the double bonds are hydrogenated, or CSM. If the RFL liquid contains less than 60 wt % of these latexes, hardening of the other polymer latex in the RFL liquid results in a reduction in the flex resistance of the cord. The use of the specified latexes in an amount of at least about 60 wt % of the latex of the RFL liquid results in an increase in the service life of the toothed-belt made from a rubber crosslinked with an organic peroxide. The toothed belt exhibits greater heat and flex resistance.

Under conditions involving greater load and tension, the tooth covering fabric material is subject to excessive abrasion wear that can cause cracking of the tooth flank which eventually results in the loss of belt serviceability due to tooth breaking. It has been found that improved wear resistance and improved resistance to tooth breaking can be obtained by using a canvas as the tooth covering fabric material.

A suitable canvas is obtained by placing yarns containing at least 50 volume percent (vol %) of aramid fibers in the longitudinal direction of the belt. The aramid fiber can be a multifilament yarn of para-type filaments commercially available under the trade names Kevlar, Technola and Toalon or a spun yarn of meta-type fibers such as those commercially available under the trade names Nomex and Cornex. The aramid fibers of the canvas can be used alone, as a double and twist yarn containing other fibers or aramid yarn and other fiber yarn may be picked in alternate relation. The proportion of aramid fiber in the longitudinal direction of the belt is more than 50 vol % with no limitation with respect to arrangement of the fibers.

The canvas is treated with an RFL liquid preferably containing a HNBR or CSM latex or with an isocyanate or epoxy. The canvas is then bonded to the belt.

Other compounding agents that can be present in the rubber of the backing member and teeth are antioxidants, such as 2-mercaptobenzoimidazole, that do not excessively inhibit the reaction of organic peroxides, reinforcing agents, such as carbon black, plasticizers and a co-crosslinking agent, such as trimethol propane trimethacrylate.

The tooth elements and the backing member are formed of an elastomeric material such as HNBR, in which more than about 80%, preferably more than about 90%, of the double bonds in the molecules of the acrylonitrile-butadiene copolymer are hydrogenated, or CSM and the cords are coated with a RFL liquid in which the latex has at least about 60 wt % of a similar HNBR or CSM latex. The resultant belt has cores coated with a rubber that remains flexible so that the belt can be driven on multiple axles and retains good tensile strength during operation. The belt exhibits high heat and flex resistance.

A method of preparing toothed belts can include the steps of providing a rubber backing material in an unvulcanized condition, providing at least one core to be imbedded in the backing material; coating the at least one core with a RFL liquid wherein the latex contains at least about 60 wt % of a HNBR or CSM; winding the coated core around the backing material; and vulcanizing the rubber of the backing material.

The following Examples are given by way of illustration and not limitation.

EXAMPLES 1 TO 8 AND COMPARATIVE EXAMPLES 1 TO 6: BELTS CONTAINING CORES TREATED WITH THE RFL OF THE PRESENT INVENTION AND TREATED WITH A CONVENTIONAL RFL

Belts of the present invention having glass cores treated with a RFL liquid having as 60 wt % of the latex component an acrylonitrile-butadiene copolymer with at least about 80% of the double bonds hydrogenated (HNBR) or a chlorosulfonated polyethylene (CSM) latex were prepared. Comparative belts were prepared using glass cores that were treated with a conventional RFL liquid that did not contain HNBR or CSM as 60 wt % of the latex component.

Strands were produced from about 200 glass fiber filaments each having a diameter of about 9 millimeters (mm) that were melt spun and surface treated with a silane coupling agent. Three strands were aligned together and immersed in one of the RFL liquids whose formulations are provided in TABLE 1, below. Each RFL liquid also included 110 parts by weight (pbw) resorcin, 81 pbw formalin (37% solids), 1.0 pbw caustic sod and 5,550 pbw water. The coated strands were dried at a temperature of 130° C. for a time period of two minutes before being baked at a temperature of 250° to 300° C. for a time period of two minutes. The dry strands were subjected to a first twisting whereby first twisted yarns having about 12 turns per 10 centimeters (cm) in the S-direction and first twisted yarns having about 12 turns per 10 cm in the Z-direction were produced. Thirteen of the S-direction first twist yarns were aligned and given a final Z-direction twist of eight turns per 10 cm. Thirteen Z-direction first twist yarns were aligned together and given a final S-direction twist of eight turns per 10 cm. To facilitate the bonding of the RFL treated glass fiber cords with the other parts of the belt, the cords were immersed in an overcoat liquid prepared by dissolving 6.7 wt % rubber composition in 3.3 wt % solvent, methylethyl ketone, and adding 90 wt % isocyanate, polyphenylisocyanate. The cords were then dried to produce glass fiber cords for use as belt cores. The belts contained cores of a S-final twisted cord and a Z-final twisted cord that were twisted together.

TABLE 1

RFL FORMULATION NOS. 1 to 12
(PARTS BY WEIGHT)

| | Formulation no. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| HNBR Latex[1] (40%) | 5000 | 4000 | 3000 | 1000 | — | — | — | — | — | — | 2500 | 1500 |
| CSM Latex[2] (40%) | — | — | — | — | — | 5000 | 4000 | 3000 | 1000 | — | 2500 | 1500 |
| VP Latex[3] (40%) | — | 1000 | 2000 | 4000 | 5000 | — | — | — | — | — | — | 2000 |
| SBR Latex[4] (40%) | — | — | — | — | — | — | 1000 | 2000 | 4000 | 5000 | — | — |

[1]Hydrogenated nitrile butadiene rubber latex wherein 80% of the double bonds are hydrogenated (solids content of 40%).
[2]Chlorosulfonated polyethylene latex (solids content of 40%).
[3]Vinylpyrrolidone latex (solids content of 40%).
[4]Styrene-butadiene rubber latex (solids content of 40%).

The tooth cover fabric material was prepared according to the following method. A 6,6 nylon warp of 210 denier as a warp and a twist yarn consisting of two 6,6 nylon of 140 denier stretched and a stretched urethane elastic yarn of 140 denier as a weft were used in weaving a canvas having a twill weave. The construction of the woven canvas was 6,6 nylon (210 D/1 × (6,6 nylon 140 D/2 + urethane 140 D/1)/1)/(120/Bcm × 130/5cm). The woven canvas was subjected to vibration underwater until it was shrunk (relaxed) to one-half of its width in the loom state. The canvas was then immersed in a treating liquid prepared by dissolving 6.7 wt % of the rubber mix formulation A described in TABLE II, below, in 3.3 wt % methylethyl ketone and adding 90 wt % polyphenylisocyanate. The previously immersed canvas was then dried to give a 0.9 mm thick treated canvas suitable as a tooth covering. The canvas is used with the weft-wise side orientated towards the longitudinal direction of the belt.

TABLE II

RUBBER MIX FORMULATION A

| COMPONENTS | PARTS BY WEIGHT |
|---|---|
| Zetpole 2010[1] | 100 |
| Zinc Oxide | 5 |
| Carbon Black FEF | 40 |
| Antioxidant MB[2] | 3 |
| Thiokol TP-95[3] | 5 |
| DCP-40[4] | 7.5 |
| Hicloth M[5] | 2.0 |

[1]Hydrogenated NBR, hydrogenation rate 95%, commercially available from Nihon Zeon.
[2]2-mercaptobenzimidazole, commercially available from Ohuchi Shinko.
[3]di-(butoxy ethoxy ethyl)adipate, commercially available from Thiocol.
[4]Substance containing 40% dicumyl peroxide, commercially available from Sanken Kako.
[5]Trimethanol propane trimethacrylate, commercially available from Seiko Kaguku.

Belts to be drive tested were fabricated using the above described 6, 6 nylon treated canvas as a tooth covering, either the hydrogenated nitrile rubber mix formulation A of TABLE II, above, which is crosslinked with an organic peroxide, or the hydrogenated nitrile rubber mix formulation B of TABLE III, below, which is crosslinked with sulfur as the rubber of the tooth elements as the backing member and the above-described glass fiber cords introduced into the backing member according to the conventional forcing-in technique. In the conventional forcing-in technique, the canvas, cords and unvulcanized rubber in sheet form are placed on a grooved mold. The grooves are perpendicular to the cords. The unvulcanized rubber is then vulcanized to fill the grooves.

The belt size of each belt of the Examples and Comparative Examples was 88ZA 19 (tooth form: ZA type; number of teeth: 88; belt width: 19.1 mm; tooth pitch: 9.525 mm). Each belt of the Examples and Comparative Examples, except for the belts of EXAMPLES 16 to 23 and COMPARATIVE EXAMPLES 15 to 20, contained 13 cords with the pitch of (distance between) the cords being 1.45 mm.

TABLE III

RUBBER MIX FORMULATION B

| COMPONENTS | PARTS BY WEIGHT |
|---|---|
| Zetpole 2020[1] | 100 |
| Zinc Oxide | 5 |
| Stearic Acid | 1 |

TABLE III-continued

RUBBER MIX FORMULATION B

| COMPONENTS | PARTS BY WEIGHT |
| --- | --- |
| Carbon Black FEF | 40 |
| Antioxidant 3C[2] | 1.0 |
| Thiokol TP-95 | 5 |
| Vulcanization Accel. CZ[3] | 1.0 |
| Vulcanization Accel. TT[4] | 1.0 |
| Sulfur | 0.5 |

[1] Hydrogenated NBR, hydrogenation rate 90%, commercially available from Nihon Zeon.
[2] N-phenyl-N-isopropyl-P-phenylenediamine commercially available from Seiko Kagaku.
[3] N-cyclohexyl-2-benzothiazylsulfenamide, commercially available from Sanshin Kagaku.
[4] Tetramethylthiuran disulfide commercially available from Sanshin Kagaku.

Figure 2:
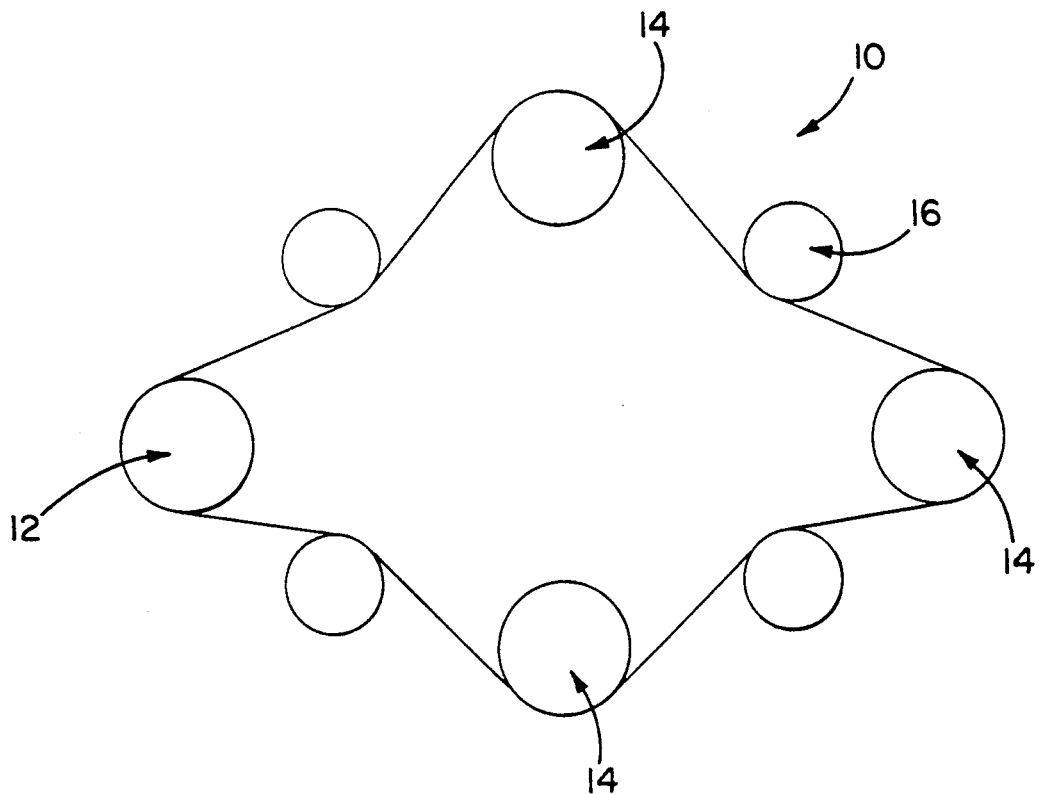
FIG. 2 is a schematic representation of a multiaxial drive tester.

A multiaxial drive tester 10 shown in FIG. 2 was used to test each belt. The multiaxial drive tester 10 includes a drive pulley 12 having 20 (not shown) and three follower pulleys 14 each having 20 teeth (not shown) arranged in vertically and horizontally opposed relation with an idler pulley 16, having a diameter of 30 mm, positioned between adjacent pulleys. Each toothed belt was trained around the exterior of the drive and follower pulleys so that the belt was under a 50 kg tension load.

The initial tensile strength of each belt prior to being run in the multiaxial drive tester was determined. Tensile strength prior to and after being run on the tester was determined using a belt sample 35 mm in length and an Autograph tester with chucks spaced 20 mm apart. The chucks were moved apart at a speed of 50 mm/min. All tensile strengths discussed herein were determined by this procedure.

Each belt was driven for 500 hours under the following conditions: temperature: 100° C.; drive pulley speed: 5,500 rpm; and axile load: 50 kilograms (kg). At the end of this time period, the tensile strength after testing of the belt was measured. The percent retained tensile strength was calculated by dividing the tensile strength after testing by the initial tensile strength and multiplying by 100. The initial tensile strength, tensile strength after testing and retained tensile strength for belts of the present invention are shown in TABLE IV A, below, and for conventional belts in TABLE IV B, below.

EXAMPLES 1, 4 and 7 (belt nos. B-1, B-6 and B-11) each used cores treated with a RFL liquid formulation that contained as the latex component 100% HNBR latex (EXAMPLE 1), 100% CSM latex (EXAMPLE 4) or 100% of a 50/50 wt % mixture of HNBR latex and CSM latex (EXAMPLE 7). Each of these belts of EXAMPLES 1, 4 and 7 retained over 80% of their tensile strength. EXAMPLES 2 and 5 (belt nos. B-2 and B-7) each used fiber cores treated with a RFL liquid that included as the latex component 80 wt % HNBR (EXAMPLE 2) or 80 wt % CSM latex (EXAMPLE 5). The belts of these EXAMPLES each retained at least 70% of their original tensile strength. EXAMPLES 3 and 6 (belt nos. B-3 and B-8) each used cores treated with an RFL liquid that included as the latex component 60% of an HNBR latex (EXAMPLE 3) or 60% of the CSM latex (EXAMPLE 8). Each of the belts of these EXAMPLES retained more than 50% of their original tensile strength. EXAMPLE 8 (belt no. B-12) utilized

TABLE IV A

BELT COMPOSITION AND MULTIAXIAL TEST RESULTS

| | EXAMPLE | | | | | | | |
| --- | --- | --- | --- | --- | --- | --- | --- | --- |
| | 1 | 2 | 3 | 4 | 5 | 6 | 7 | 8 |
| Belt no. | B-1 | B-2 | B-3 | B-6 | B-7 | B-8 | B-11 | B-12 |
| Glass fiber cord treating formulation no. | 1 | 2 | 3 | 6 | 7 | 8 | 11 | 12 |
| Tooth element-backing member formulation no. | A | A | A | A | A | A | A | A |
| Tensile strength of belts within same lot, prior to test run (kgf/19.1 mm) | 1175 | 1150 | 1160 | 1160 | 1150 | 1155 | 1150 | 1140 |
| Tensile strength after run (kgf/19.1 mm) | 970 | 850 | 615 | 1020 | 810 | 600 | 1000 | 720 |
| Retension of tensile strength (%) | 83 | 74 | 53 | 88 | 70 | 52 | 87 | 63 |

TABLE IV B

BELT COMPOSITION AND TENSILE TEST RESULTS

| | COMPARATIVE EXAMPLE | | | | | |
| --- | --- | --- | --- | --- | --- | --- |
| | 1 | 2 | 3 | 4 | 5 | 6 |
| Belt no. | B-4 | B-5 | B-9 | B-10 | B-13 | B-14 |
| Glass fiber cord treating formulation no. | 4 | 5 | 9 | 10 | 1 | 5 |
| Tooth element-backing member formulation no. | A | A | A | A | B | B |
| Tensile strength of belts within same lot, prior to test run (kfg/19.1 mm) | 1130 | 1145 | 1140 | 1160 | 1170 | 1120 |
| Tensile strength after run (kgf/19.11 mm) | 410 | 380 | 375 | 350 | 620 | 580 |
| Retension of tensile strength (%) | 36 | 33 | 33 | 30 | 53 | 52 | fiber cores treated with a RFL liquid that contained as a latex component 30% HNBR latex and 30% CSM latex. The belt of this EXAMPLE (B-12) retained more than 60% of its original tensile strength. The test results indicate that as the amount of HNBR or CSM latex in the RFL liquid increases so does the percent of the retained tensile strength.

COMPARATIVE EXAMPLES 1 to 4 exhibited a significant decrease in tensile strength of more than 66%. The belts of these COMPARATIVE EXAMPLES were made with the rubber mix formulation A crosslinked by the organic peroxide and glass fiber cords wherein the RFL liquid used to treat the cords had a hydrogenated nitrile rubber or chlorosulfonated polyethylene rubber latex content of less than 60%.

COMPARATIVE EXAMPLES 5 and 6 exhibited a reduction in tensile strength of about 50%. COMPARATIVE EXAMPLE 5 used rubber mix formulation B for the tooth elements and backing member which is cured using sulfur rather than the peroxide which is used in rubber mix formulation A. The belt of COMPARATIVE EXAMPLE 5 used fiber cords treated with RFL formulation 1 whose latex component was 100% HNBR latex. A comparison of COMPARATIVE EXAMPLE 5 and EXAMPLE 1, which used the same RFL formulation no. 1 and the peroxide-containing rubber mix formulation A, shows the significance of using peroxide in the rubber mix as opposed to sulfur. The belt of EXAMPLE 1 retained 83% of its tensile strength whereas the belt of COMPARATIVE EXAMPLE 5 only retained 53% of its tensile strength. COMPARATIVE EXAMPLE 6 used glass fiber cords treated with a RFL liquid that did not contain HNBR or CSM as the latex component and used rubber mix formulation B which contained sulfur and no peroxide. The belt of COMPARATIVE EXAMPLE 6 only retained 52% of its tensile strength.

EXAMPLES 9 TO 11 AND COMPARATIVE EXAMPLES 7 TO 11: TRIAXIAL DRIVE TEST

A triaxial drive tester was used to test some of the belts of EXAMPLES 1 to 8. The triaxial drive tester has a drive pulley with 18 teeth, one follower pulley having 36 teeth and a tension pulley having a diameter of 52 mm that is disposed between the drive and follower pulleys. The triaxial drive test was conducted at a temperature of 120° C., a drive pulley speed of 7,200 rpm, a follower pulley load of 5 pounds per square inch (psi) and an initial tension of 15 kgs. The tensile strength before testing and after a test of 1,000 revolutions were determined. The test results are shown in Table V.

The belts of EXAMPLES 9, 10 and 11 were identical to the belts of EXAMPLES 1, 2 and 4, respectively, i.e., belt nos. B-1, B-2 and B-6, respectively. The belts of COMPARATIVE EXAMPLES 7 to 11 were identical to the belts of COMPARATIVE EXAMPLES 1, 2, 4, 5 and 6, respectively, i.e., belt nos. B-4, B-5, B-10, B-13 and B-14.

The belts of EXAMPLES 9 and 11 retained a significant percent of their tensile strength after testing. The belt of EXAMPLE 10 retained most of its initial tensile strength.

In contrast, the belts of COMPARATIVE EXAMPLES 7, 8 and 9 suffered a loss of most of their initial tensile strength.

The belts of COMPARATIVE EXAMPLES 10 and 11 both used as the rubber for the tooth element and backing member rubber mix formulation no. B. The only difference between the belt of EXAMPLE 9 and of COMPARATIVE EXAMPLE 10 is the use of peroxide-containing rubber mix formulation no. A in EXAMPLE 9 and the use of sulfur-containing rubber mix formulation no. B in COMPARATIVE EXAMPLE 10. Although the belt of EXAMPLE 9 retained 88% of its original tensile strength, the belt of COMPARATIVE EXAMPLE 10 only retained 62%. This comparison shows the inferiority of a belt made using a sulfur-containing rubber for the tooth element and backing member. COMPARATIVE EXAMPLE 11 also used sulfur-containing rubber mix formulation no. B for the tooth element and backing member. The belt of COMPARATIVE EXAMPLE 11 only retained 65% of its tensile strength.

TABLE V

| BELT COMPOSITION AND TRIAXIAL TEST RESULTS | | | | | | | |
|---|---|---|---|---|---|---|---|
| EXAMPLE | | | COMPARATIVE EXAMPLE | | | | |
| 9 | 10 | 11 | 7 | 8 | 9 | 10 | 11 |
| Belt no. | | | | | | | |
| B-1 | B-2 | B-6 | B-4 | B-5 | B-10 | B-13 | B-14 |
| Glass fiber cord treating formulation no. | | | | | | | |
| 1 | 2 | 6 | 4 | 5 | 10 | 1 | 5 |
| Tooth element- | | | | | | | |
| A | A | A | A | A | A | B | B |

TABLE V-continued

| BELT COMPOSITION AND TRIAXIAL TEST RESULTS | | | | | | | |
|---|---|---|---|---|---|---|---|
| EXAMPLE | | | COMPARATIVE EXAMPLE | | | | |
| 9 | 10 | 11 | 7 | 8 | 9 | 10 | 11 |
| backing member formulation no. | | | | | | | |
| Tensile strength of belts within same lot, prior to test run (kgf/19.1 mm) | | | | | | | |
| 1175 | 1150 | 1160 | 1130 | 1145 | 1160 | 1170 | 1120 |
| Tensile strength after run (kgf/19.1 mm) | | | | | | | |
| 1030 | 650 | 930 | 320 | 175 | 220 | 720 | 730 |
| Retension of tensile strength (%) | | | | | | | |
| 88 | 57 | 80 | 28 | 15 | 19 | 62 | 65 |

As was observed in EXAMPLES 1 to 8, belts using an organic peroxide-crosslinked rubber mix had a very large decrease in tensile strength when the proportion of the HNBR or CSM was less that 60 wt % of the latex of the RFL liquid applied to the glass core.

EXAMPLES 12 TO 15 AND COMPARATIVE EXAMPLES 12 TO 14: BELTS HAVING TOOTH COVERING CANVAS

Tooth covering canvases of the present invention (T-1, T-2, T-4 and T-5) and comparative tooth covering canvases (T-3, T-6 and T-7) were prepared as described in TABLE VI A and B, below.

Belts of EXAMPLES 12 to 15 and COMPARATIVE EXAMPLES 12 to 14 were made with the materials of TABLE VII, below, including the indicated tooth covering canvas. The process of bonding the tooth covering canvases is the same as that used in the belts of EXAMPLES 1 to 8.

The resistance of each belt to tooth breaking and wear resistance of the tooth covering fabric was measured by training the belt around one drive pulley with 18 teeth and two follower pulleys each having 18 teeth at an angle of 120°. The belt was then run at a temperature of 120° C., a drive pulley speed of 6,000 rpm, a follower pulley load of 7 psi with 6 of the teeth of the follower pulley mating with the belt until tooth breakage. The appearance of the belt at the end of its service life was also observed. The test results are shown in Table VII, below.

The test results indicate that when the tooth covering is a canvas with more than 50 vol % of the yarns in the longitudinal direction of the tooth covering is an aramid yarn (the belts of EXAMPLES 12 to 15), the belt has a longer service life before tooth breakage and is less liable to experience abrasion wear as compared to belts using a canvas that has less than 50 vol % of aramid yarn and an aliphatic amide yarn (the belts of COMPARATIVE EXAMPLES 12 to 14).

TABLE VI A

| TOOTH COVERING CANVASES | | | | |
|---|---|---|---|---|
| Canvas No. | T-1 | T-2 | T-3 | T-4 |
| Warp | | | | |
| Raw yarn (filament thickness) | 6.6 nylon 210 D/1 (30 denier) | 6.6 nylon 210 D/1 (30 denier) | 6.6 nylon 210 D/1 (30 denier) | "Technola" 210 D/1 (approx. 1.5 denier) |

TABLE VI A-continued

| | TOOTH COVERING CANVASES | | | |
|---|---|---|---|---|
| Canvas No. | T-1 | T-2 | T-3 | T-4 |
| Number of warps (warps/5. cm) | 100 | 100 | 100 | 100 |
| Weft | | | | |
| Raw yarn | "Technola" 200 D/2 Spandex 140 D/1 | "Cornex" 20's/2 | 6.6 nylon 140 D/3 Spandex 140 D/1 | "Technola" 200 D/2 Spandex 140 D/1 |
| Twist yarn | 30 turns/10 cm | | | |
| Number of yarns | 120/5 cm | | | |
| Construction | 2/2 twill | | | |

TABLE VI B

| | COMPARATIVE TOOTH COVERING CANVASES | | |
|---|---|---|---|
| Canvas No. | T-5 | T-6 | T-7 |
| Warp | | | |
| Raw yarn (filament thickness) | "Technola" 200 D/1 (approx. 15. denier) | | |
| Number of warps (warps/5 cm) | 100 | 100 | 100 |
| Weft | | | |
| Raw yarn | "Cornex" 20's/2 Spandex 140 D/1 | Cornex" 30's/1 6.6 nylon 140 D/2 Spandex 140 D/1 | 6.6 nylon 140 D/3 Spandex 140 D/1 |
| Twist yarn | 30 turns/10 cm | | |
| Number of yarns | 120/5 cm | | |
| Construction | 2/2 twill | | |

TABLE VII

| | BELT COMPOSITION AND TEST RESULTS | | | | | | |
|---|---|---|---|---|---|---|---|
| | EXAMPLE | | | | COMPARATIVE EXAMPLE | | |
| | 12 | 13 | 14 | 15 | 12 | 13 | 14 |
| Belt no. | B-15 | B-16 | B-17 | B-18 | B-19 | B-20 | B-21 |
| Glass fiber cord treating formulation no. | 1 | 1 | 1 | 7 | 7 | 1 | 7 |
| Tooth covering canvas no. | T-1 | T-2 | T-3 | T-4 | CT-1 | CT-2 | CT-3 |
| Belt condition at end of life | Tooth break due to flank cracking | | | | (1) | (2) | (1) |
| Life (hrs.) | 313 | 342 | 285 | 278 | 110 | 180 | 120 |

(1) Tooth break due to canvas wear at tooth root
(2) Tooth break due to flank cracking and tooth root wear

EXAMPLES 16 TO 23 AND COMPARATIVE EXAMPLES 15 TO 20: BELTS CONTAINING ARAMID FIBERS

A strand of two aramid fibers commercially available under the trade name Technola from Teijin, Ltd. was twisted in either the S-direction or Z-direction at a rate of 15 turns per 10 cm to produce two pairs of aramid fiber cords—one twisted in the S-direction the other in the Z-direction. As shown in Table VIII, below, with the two pairs of cords were immersed in RFL liquids having the formulations of TABLE I, above. The cords were then dried at a temperature cf 130° C. for a time period of 20 minutes and then baked at a temperature of 200° to 250° C. for a time period of two minutes. The baked cords were then immersed in an overcoat liquid prepared by dissolving rubber mix formulation A or B of TABLES II and III, respectively, in methylethyl ketone with polyphenylisocyanate followed by drying. The aramid fiber cores were then used as belt cores.

The belts of EXAMPLES 16 to 23 and COMPARATIVE EXAMPLES 15 to 20 contained 21 cores and with a pitch of 0.87 mm were prepared by the procedure used to make the belts of EXAMPLES 1 to 8. The tensile strength of the belts was measured prior to testing on the multiaxial drive tester described above under the same conditions that the belts of EXAMPLES 1 to 8 were tested. The test results are provided in TABLES VIII A and B, below.

The test results show that as the amount of HNBR or CSM in the latex of the RFL liquid increases, the retained tensile strength increases.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

TABLE VIII A

| | EXAMPLE | | | | | | | |
|---|---|---|---|---|---|---|---|---|
| | 16 | 17 | 18 | 14 | 20 | 21 | 22 | 23 |
| Belt no. | C-1 | C-2 | C-3 | C-6 | C-7 | C-8 | C-11 | C-12 |
| Aramid fiber cord treating formulative no. | 1 | 2 | 3 | 6 | 7 | 8 | 11 | 12 |
| Tooth element-backing member formulation no. | A | A | A | A | A | A | A | A |
| Tensile strength of belts within same lot, prior to test run (kgf/19.1 mm) | 1260 | 1210 | 1180 | 1250 | 1205 | 1160 | 1270 | 1200 |
| Tensile strength after run (kgf/19.1 mm) | 1095 | 870 | 710 | 1035 | 770 | 603 | 1080 | 925 |
| Retension of tensile strength (%) | 87 | 72 | 60 | 83 | 64 | 52 | 85 | 77 |

TABLE VIII B

| | COMPARATIVE EXAMPLES | | | | | |
|---|---|---|---|---|---|---|
| | 15 | 16 | 17 | 18 | 19 | 20 |
| Belt no. | C-4 | C-5 | C-9 | C-10 | C-13 | C-14 |
| Aramid fiber cord treating formulation no. | R-4 | R-5 | R-9 | R-10 | R-1 | R-5 |
| Tooth element-backing member formulation no. | A | A | A | A | A | A |
| Tensile strength of belts within same lot, prior to test run (kfg/19.1 mm) | 1150 | 1110 | 1130 | 1100 | 1260 | 1255 |
| Tensile strength after run (kfg/19.1 mm) | 590 | 535 | 630 | 563 | 772 | 710 |
| Retension of tensile strength (%) | 48 | 43 | 50 | 45 | 62 | 57 |

We claim:

1. A toothed belt comprising a backing member rubber and a plurality of rubber teeth extending from a surface of the backing member and at least one core imbedded in the backing member, the at least one core being treated with a resorcin-formalin-latex liquid wherein at least 60 weight percent of the latex component of the RFL liquid is selected from the group of hydrogenated acrylonitrile-butadiene (HNBR) latex in which more than about 80% of the double bonds are hydrogenated and chlorosulfonated polyethylene (CSM) latex.

2. The toothed belt in accordance with claim 1 wherein at least about 80% of the latex is at least one of HNBR and CSM.

3. The toothed belt in accordance with claim 1 wherein the rubber of the backing member is cured with a peroxide.

4. The toothed belt in accordance with claim 3 wherein the peroxide is a dialkyl peroxide.

5. The toothed belt in accordance with claim 1 wherein at least 90% of the double bonds are hydrogenated.

6. The toothed belt in accordance with claim 1 wherein the rubber of the backing member is at least one of hydrogenated acrylonitrile-butadiene rubber having at least 80% of the double bonds hydrogenated and chlorosulfonated polyethylene.

7. The toothed belt in accordance with claim 6 wherein the rubber of the backing material is cured with a dialkyl peroxide.

8. The toothed belt in accordance with claim 1 further comprising a teeth covering fabric, the teeth covering fabric comprising yarns containing at least about 50 volume percent of aramid fibers in the longitudinal direction of the belt.

9. A toothed belt comprising a rubber backing member and a plurality of rubber teeth extending from a surface of the backing member, at least one core imbedded in the backing member and a tooth covering fabric that covers the at least one tooth, the at least one core being treated with a resorcin-formalin-latex (RFL) liquid wherein the latex component comprises at least about 60 wt % of at least one of a hydrogenated acrylonitrile-butadiene rubber latex having at least 80% of the double bonds hydrogenated and a chlorosulfonated polyethylene latex, the rubber of the backing material and teeth comprising at least one of a hydrogenated acrylonitrile-butadiene rubber having at least about 80% of the double bonds hydrogenated and a chlorosulfonated polyethylene rubber that is cured with a peroxide and the canvas comprising yarns containing at least about 50 vol % of aramid fibers in the longitudinal direction of the belt.

10. The toothed belt in accordance with claim 9 wherein the latex contains at least about 80% of the at least one of hydrogenated acrylonitrile-butadiene latex and chlorosulfonated polyethylene latex.

11. The belt in accordance with claim 9 wherein the peroxide is a dialkyl peroxide 12. The belt in accordance with claim 9 wherein the tooth covering fabric is treated with the RFL liquid.

13. A method of making a toothed belt comprising the steps of:
providing a rubber backing material containing at least one of hydrogenated acrylonitrile-butadiene rubber having at least 80% of the double bonds hydrogenated and chlorosulfonated polyethylene;
providing at least one core treated with a resorcin-formalin-latex (RFL) liquid wherein the latex component contains at least about 60 wt % of at least one of a hydrogenated acrylonitrile-butadiene rubber latex having at least 80% of the double bonds hydrogenated and a chlorosulfonated polyethylene latex;
winding the at least one core around the backing material; and
curing the rubber of the backing member.

14. The method in accordance with claim 12 further comprising the step of adhering to the teeth at tooth curving fabric comprising yarns containing at least 50 volume percent of aramid fibers in the longitudinal direction of the belt.

* * * * *